(12) United States Patent
Evans et al.

(10) Patent No.: US 7,350,479 B2
(45) Date of Patent: Apr. 1, 2008

(54) SYSTEM AND METHOD FOR CONTROLLING GROWTH OF AQUATIC PLANTS UTILIZING BIO-ERODING MEANS IMPLANTED IN TRIPLOID GRASS CARP

(75) Inventors: James A. Evans, Tallulah, LA (US); Leandro E. Miranda, Starkville, MS (US); James P. Kirk, Vicksburg, MS (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 336 days.

(21) Appl. No.: 11/179,541

(22) Filed: Jul. 13, 2005

(65) Prior Publication Data
US 2006/0191489 A1 Aug. 31, 2006

(51) Int. Cl.
*A01K 61/00* (2006.01)
*A01K 69/00* (2006.01)

(52) U.S. Cl. .................. 119/215; 119/174; 119/712; 119/860; 43/4.5; 43/1

(58) Field of Classification Search ........... 119/215, 119/860; 43/4.5
See application file for complete search history.

(56) References Cited

U.S. PATENT DOCUMENTS

| | | | |
|---|---|---|---|
| 4,304,767 A | 12/1981 | Heller et al. | |
| 4,764,364 A | 8/1988 | Heller et al. | |
| 4,765,989 A * | 8/1988 | Wong et al. | 424/473 |
| 4,800,056 A * | 1/1989 | Eckenhoff et al. | 264/129 |
| 4,855,132 A | 8/1989 | Heller et al. | |
| 4,909,250 A | 3/1990 | Smith | |
| 4,946,931 A | 8/1990 | Heller et al. | |
| 4,957,998 A | 9/1990 | Heller et al. | |
| 5,133,739 A | 7/1992 | Bezwada et al. | |
| 5,236,563 A | 8/1993 | Loh | |
| 5,312,390 A * | 5/1994 | Wong | 604/892.1 |
| 5,318,557 A * | 6/1994 | Gross | 604/891.1 |
| 5,456,919 A * | 10/1995 | Patell et al. | 424/451 |
| 5,562,915 A * | 10/1996 | Lowe et al. | 424/438 |
| 5,674,518 A * | 10/1997 | Fajt | 424/408 |
| 5,861,166 A * | 1/1999 | Eckenhoff | 424/422 |
| 5,897,874 A * | 4/1999 | Stevens et al. | 424/451 |
| 5,939,453 A | 8/1999 | Heller et al. | |

(Continued)

OTHER PUBLICATIONS

U.S. Appl. No. 10/943,646, Evans et al.

*Primary Examiner*—Peter M. Poon
*Assistant Examiner*—Joshua J Michener
(74) *Attorney, Agent, or Firm*—Earl H. Baugher, Jr.

(57) ABSTRACT

An "implant and forget" device for interacting with biota after a pre-established time period. Preferably, the biota are fauna and more particularly fish. In select embodiments, the device comprises packaging enclosing apparatus for timing interaction via opening the packaging. In select embodiments of the present invention, the device is a sealed capsule inserted in fish. Embodiments of the present invention are implanted in triploid grass carp (*Ctenopharyngodon idella*) to facilitate control of aquatic weeds in bodies of water. When the carp have been in the water for a pre-established approximate period of time, toxins in the device are dispensed via long term bioerosion of the sealed opening in the packaging. Otherwise, the carp may destroy all vegetation and harm the aquatic environment for other aquatic life. Several alternative bioerodible seal configurations are provided as embodiments.

14 Claims, 4 Drawing Sheets

U.S. PATENT DOCUMENTS

| | | |
|---|---|---|
| 5,968,543 A | 10/1999 | Heller et al. |
| 6,099,458 A * | 8/2000 | Robertson ............ 600/8 |
| 6,132,359 A * | 10/2000 | Bolenbaugh ............ 600/8 |
| 6,322,819 B1 * | 11/2001 | Burnside et al. ............ 424/494 |
| 6,524,606 B1 | 2/2003 | Ng et al. |
| 6,575,888 B2 * | 6/2003 | Zamora et al. ............ 600/3 |
| 6,590,059 B2 | 7/2003 | Ng et al. |
| 6,667,371 B2 | 12/2003 | Ng et al. |
| 6,682,522 B2 * | 1/2004 | Carr et al. ............ 604/892.1 |
| 6,822,000 B2 | 11/2004 | Ng et al. |
| 6,886,290 B2 * | 5/2005 | Scott ............ 43/4.5 |
| 2004/0157967 A | 3/1990 | Smith |
| 2001/0044567 A1 * | 11/2001 | Zamora et al. ............ 600/3 |
| 2004/0022852 A1 | 2/2004 | Chopra |
| 2004/0096506 A1 | 5/2004 | Heller et al. |

* cited by examiner

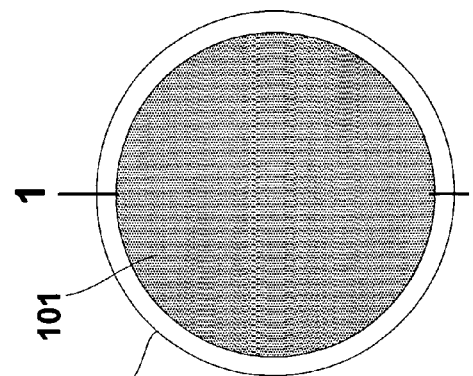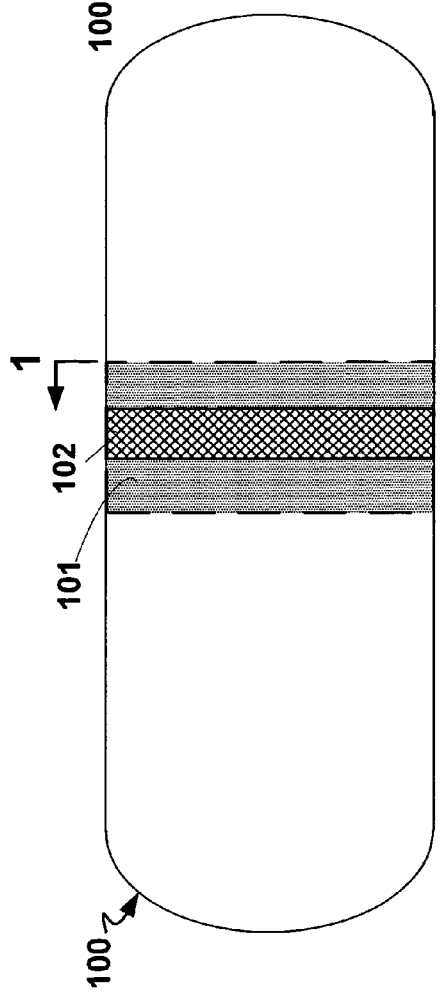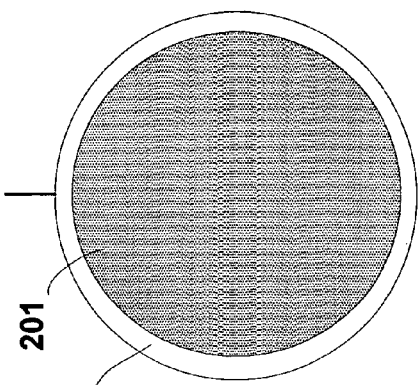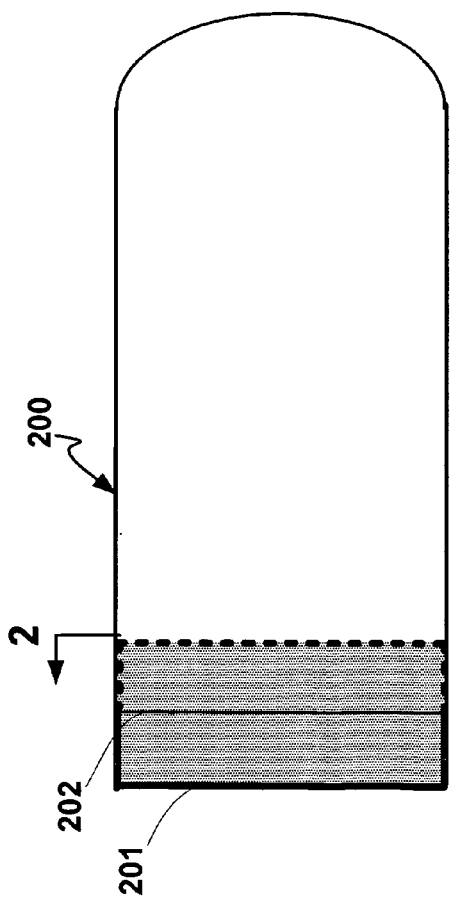

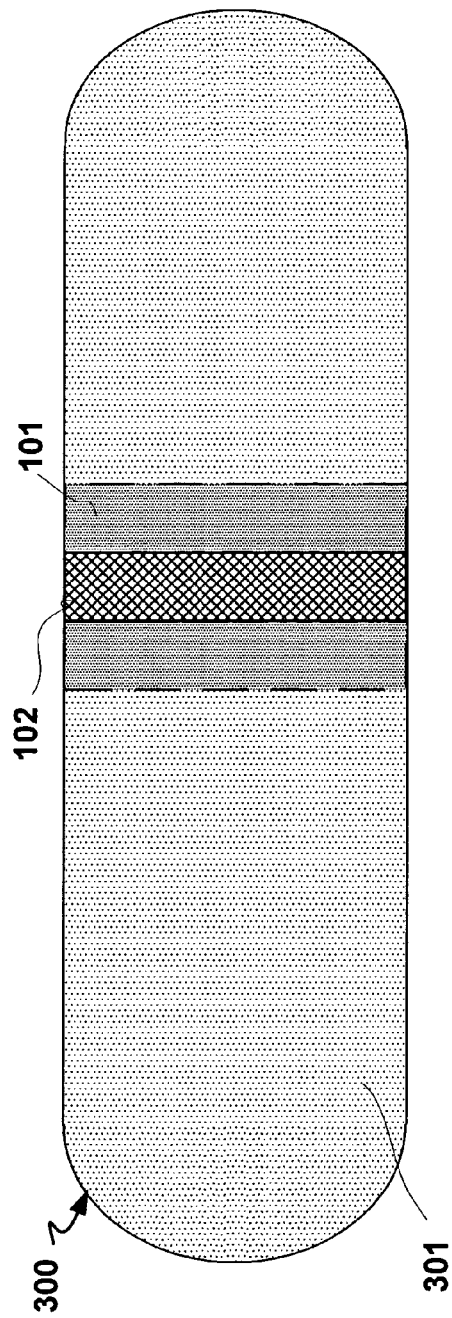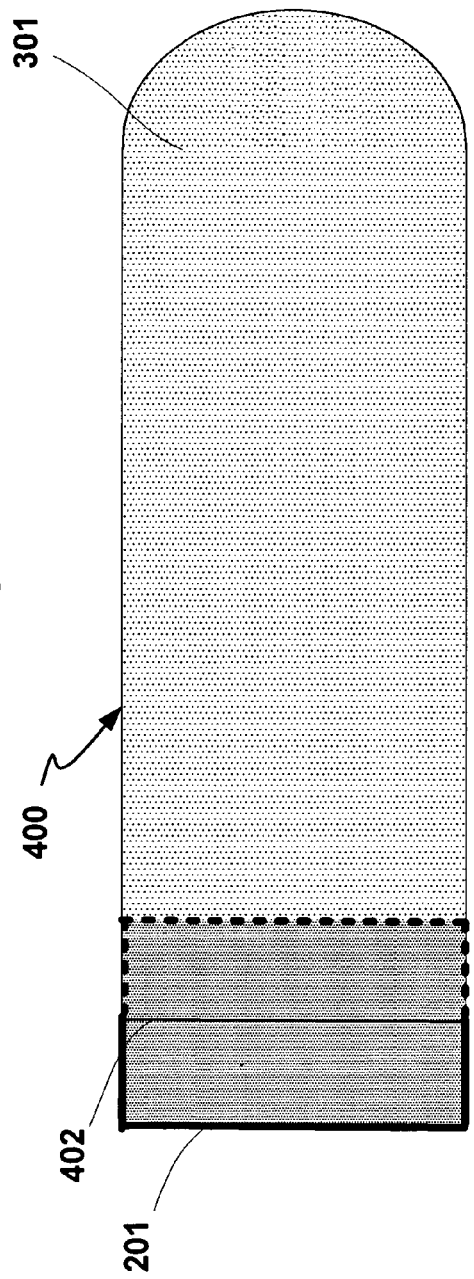

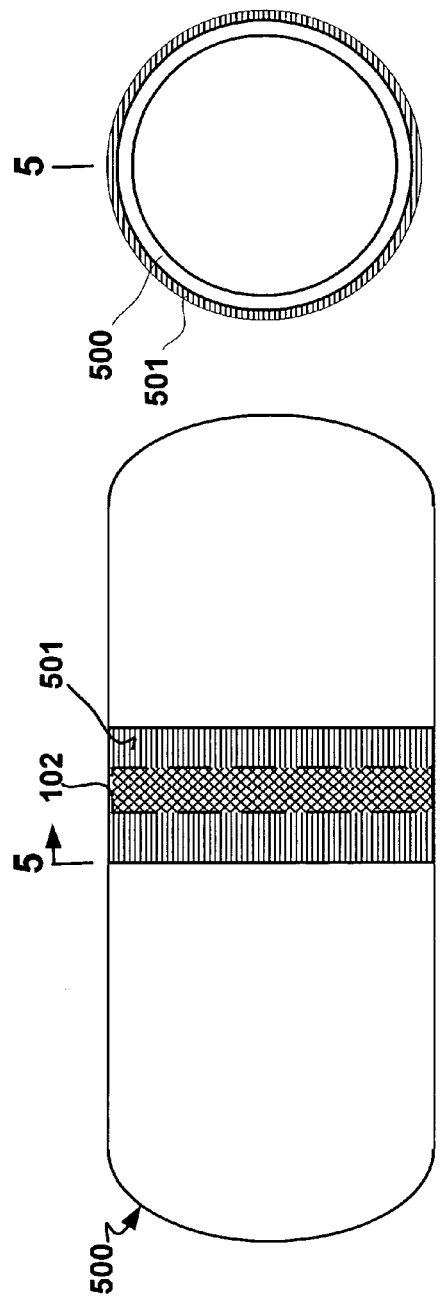
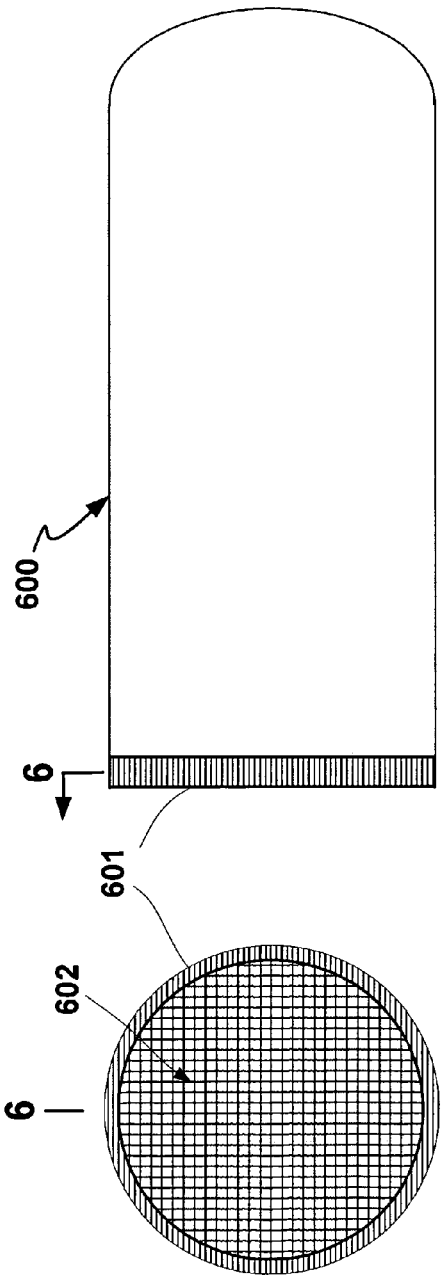

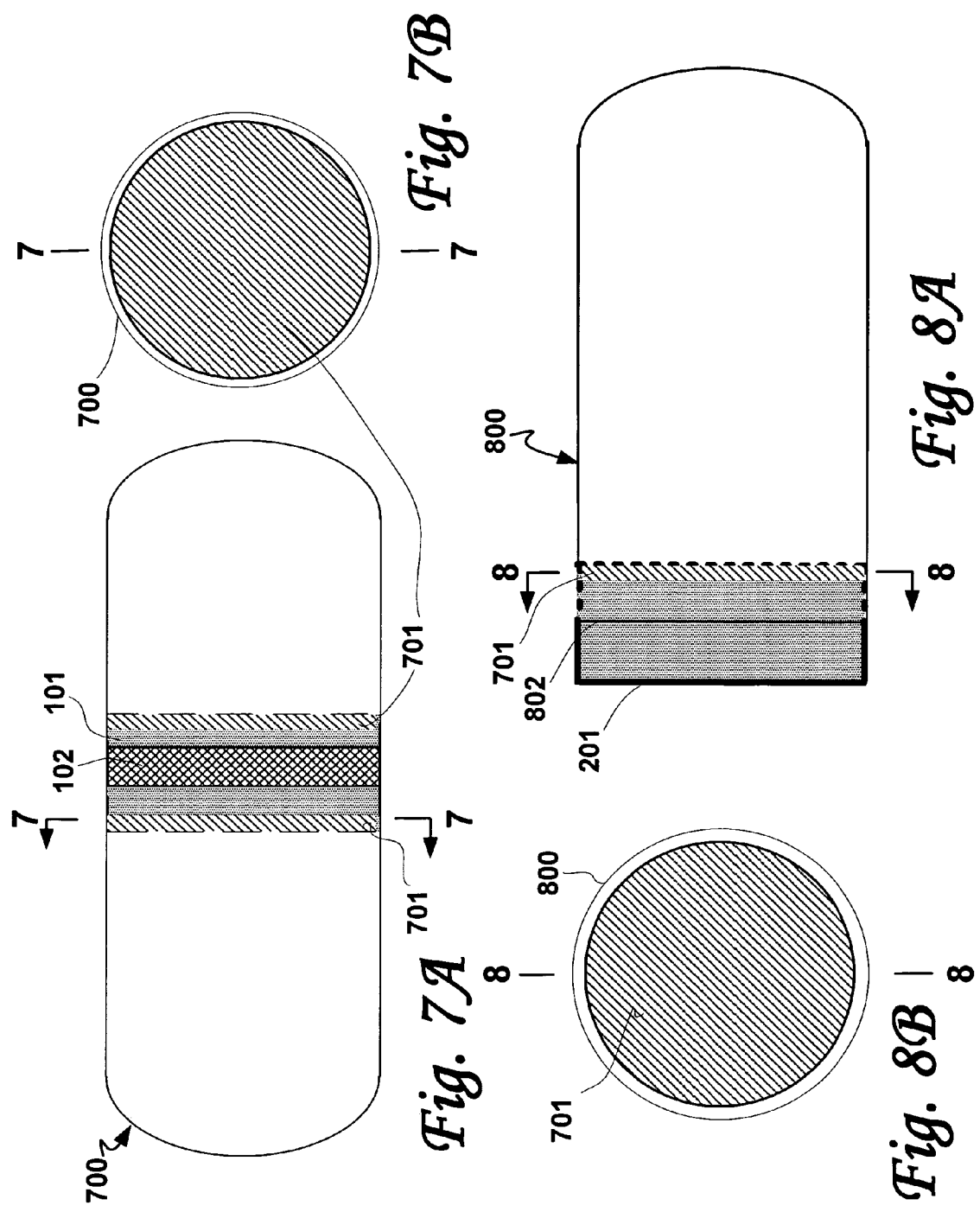

SYSTEM AND METHOD FOR CONTROLLING GROWTH OF AQUATIC PLANTS UTILIZING BIO-ERODING MEANS IMPLANTED IN TRIPLOID GRASS CARP

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Phillip Stewart at 601 634-4113.

RELATED INVENTIONS

Under 35 U.S.C § 120, this application claims the benefit of prior co-pending U.S. patent application Ser. No. 10/943,646, A Release Mechanism To Interact with Biota, in Particular Fauna that May Outgrow Available Habitat, by Evans et al., filed Sep. 10, 2004, incorporated herein by reference.

BACKGROUND

Triploid grass carp (*Ctenopharyngodon idella*) are sterile fish used to control nuisance aquatic vegetation. This species provides long-term aquatic plant control, e.g., nominally five to seven and a maximum possible of ten years, at less cost than either herbicides or mechanical harvesting. One limitation on their use is establishing an optimum stocking level, i.e., too few and the aquatic vegetation is not affected and too many and it is totally eliminated. A second limitation is associated with the latter in that they have a propensity to leave stocking sites, thus impacting desirable vegetation in other locations.

Recently, scientists achieved stocking densities in small impoundments that allowed a targeted level of aquatic plant control. However, achieving desired levels of control in large reservoir systems has been inconsistent. Nevertheless, techniques to age and collect triploid grass carp in large reservoir systems were developed. These techniques allowed scientists to project population trends. The ability to stock and predict subsequent populations of triploid grass carp facilitates achieving optimal populations.

Any carp that migrate may impact native aquatic vegetation in floodplain lakes and in estuaries. In these areas in particular, aquatic plants are needed to keep the natural balance of the environment. Aquatic plants are the primary source of oxygen production in many standing waters as well as providing a protective haven for small fish. In estuaries, these carp may consume native aquatic vegetation required for controlling erosion or needed as nursery habitat for economically important fisheries.

Given the need to optimize population density at stocking sites and to limit potentially damaging effects outside the stocking sites, one control mechanism is ability to limit the life span of these carp. For example, larger fish require more food, thus as they get larger, fewer are needed to maintain the same control of undesirable vegetation. This capability allows resource managers to precisely control population mix and achieve consistency in aquatic plant control in large reservoir systems. Further, this capability limits the time that escaped migrating carp roam freely. Hence, implementing life span control via a passive "plant and forget" method using bioerodible materials for timing delivery of toxins in implants permits introducing triploid grass carp as a suitable management tool for controlling undesirable aquatic vegetation in large impoundments. The term "bioerodible" includes self-destruction of an implant by dissolution, biodegradation, or both.

BRIEF DESCRIPTION OF THE DRAWINGS

FIG. 1A illustrates a side view of an enclosure that may be used with an embodiment of the present invention.

FIG. 1B illustrates a cross-section taken through 1-1 of FIG. 1A.

FIG. 2A illustrates a side view of an enclosure different from that of FIG. 1A that may be used with an embodiment of the present invention.

FIG. 2B illustrates a cross-section taken through 2-2 of FIG. 2A.

FIG. 3 illustrates a side view of an embodiment of the present invention employing an enclosure similar to that of FIGS. 1A and 1B.

FIG. 4 illustrates a side view of an embodiment of the present invention employing an enclosure similar to that of FIGS. 2A and 2B.

FIG. 5A illustrates a side view of an enclosure similar in outer shape to that of FIG. 1A, but different in design, that may be used with an embodiment of the present invention.

FIG. 5B illustrates a cross-section taken through 5-5 of FIG. 5A.

FIG. 6A illustrates a side view of an enclosure similar in outer shape to that of FIG. 2A, but different in design, that may be used with an embodiment of the present invention.

FIG. 6B illustrates a cross-section taken through 6-6 of FIG. 6A.

FIG. 7A illustrates a side view of an enclosure similar in outer shape to that of FIG. 1A, but different in design from both FIGS. 1A and 5A, that may be used with an embodiment of the present invention.

FIG. 7B illustrates a cross-section taken through 7-7 of FIG. 7A.

FIG. 8A illustrates a side view of an enclosure similar in outer shape to that of FIG. 2A, but different in design from both FIGS. 2A and 6A, that may be used with an embodiment of the present invention.

FIG. 8B illustrates a cross-section taken through 8-8 of FIG. 8A.

DETAILED DESCRIPTION

Select embodiments of the present invention envision an apparatus and method for delivering a payload to living biota after passage of a pre-established substantially extended time period. In general, an embodiment of the present invention includes biocompatible packaging enclosing one or more payloads and means for timing delivery of the payload and facilitating opening of the packaging to deliver a payload. In select embodiments of the present invention, the apparatus is implanted in fauna, specifically fish, in an "implant and forget" capsule prior to their release into a body of water. The payload may be a lethal dose of one or more toxins. In select embodiments of the present invention, flora may have either a fertilizer or a systemic toxin inserted to either promote growth or to kill parasites such as thrips (*Thysanoptera*) after an extended passage of time.

Embodiments of the present invention are implanted in sterile triploid grass carp (*Ctenopharyngodon idella*) that are used to control aquatic weeds. When the carp have been in the water for a pre-specified extended period, ostensibly long enough to effectively control the target aquatic plants, the apparatus dispenses one or more toxins to kill them. Otherwise, the carp may destroy all vegetation and harm the aquatic environment for other aquatic life.

In select embodiments of the present invention, the packaging is a multi-part capsule of inert biocompatible material. The payload is sealed in the capsule prior to use. The capsule is suitable for retention within living biota, in particular, fish. In select embodiments of the present invention, the apparatus is completely passive, i.e., a portion of the capsule bioerodes after passage of a pre-established substantially extended time period to open the capsule to deposit its payload. The substantially extended time period may be from six months to several years depending on user requirements. On average, the substantially extended time period may be pre-specified up to three years, although the maximum time may be near the average life expectancy for the particular species of biota.

Select embodiments of the present invention envision a system for controlling growth of aquatic plants in a body of water. Select embodiments of the present invention comprise one or more triploid grass carp (Ctenopharyngodon idella) and means for pre-establishing the approximate life span of the carp. In select embodiments of the present invention, the means for pre-establishing comprise biocompatible (inert) packaging enclosing a lethal dose of one or more toxins and means for timing delivery of the toxins via bioeroding one or more incorporated bioeroding configurations, such as seals or plugs, thus opening the packaging to release the toxin into the bloodstream of the carp. The means for pre-establishing the approximate lifespan is implanted in the carp prior to introduction of the carp into a body of water.

In select embodiments of the present invention, the payload of the means for pre-establishing the approximate lifespan is one or more toxins. Toxin is encapsulated in one or more multi-part capsules that are sealed prior to use to yield an "initially leak proof" package suitable for retention by living biota. In select embodiments of the present invention, bioerodible configurations incorporated in the means for pre-establishing the approximate lifespan are selected from the group consisting of bioerodible plugs, bioerodible tape, and combinations thereof. In select embodiments of the present invention, a bioerodible plug may be fitted in one end of a capsule; a bioerodible plug may join two halves of a capsule; bioerodible tape wrapped around the overlapping area of two friction-fit conjoined sections of a capsule; bioerodible tape "sealing" a cap on one end of a capsule, and combinations thereof.

In select embodiments of the present invention, the means for timing in the means for pre-specifying the approximate lifespan comprises bioerodible material pre-specified as to the approximate time period over which the material substantially bioerodes. This bioerodible material, such as a bioerodible polymer, preferably has the following properties: reliable erosion rates, non-mutagenic, nonantigenic, non-toxic and biocompatible. This material must be consistent with the manufacturing process and not interact with the toxin or other agent utilized in this delivery device.

Candidate bioerodible polymers may be synthesized from monomers comprising esters, anhydrides, ortho-esters, and amides. Examples of biodegradable polymers are Poly(glycolide), Poly-L-actide, Poly(lactide-co-glycolide), Poly(α-caprolactone), Poly(diaxanone), Poly(glyconate), Poly(Ortho-Esters), Copolymers of glycolic, lactic, and other α-hydroxy acids, block copolymers prepared from polyethylene glycols and certain Poly(Ortho-Esters), and random copolymers of these polymers.

Plugs may be cut from self-reinforced polyglycolide (SR-PGA) rods coated with slowly absorbable polymers. To reduce the degradation rate, the rods may be coated with n-butyl-2-cyanoacrylate, Poly(dioxanone) (PDS), Poly (beta-hydroxybutyrate) (PHBA), or Poly-L-lactide (PLLA).

In select embodiments of the present invention, a method for delivering one or more payloads to living biota during an approximated pre-specified time period comprises:
providing a device for delivering the payload, the device comprising biocompatible packaging enclosing the payload and means for timing and facilitating delivery of the payload by opening the packaging, such that the means for timing are selected to activate within a pre-specified substantially extended time period; and
inserting the device into the biota.

In select embodiments of the present invention, a method for controlling growth of aquatic plants in a body of water comprises:
providing one or more triploid grass carp (Ctenopharyngodon idella);
providing means for pre-establishing the approximate lifespan of the carp, comprising:
biocompatible packaging enclosing one or more toxins; and
means for timing and facilitating delivery of the toxins via opening the packaging;
implanting the means for pre-establishing the approximate lifespan into the carp; and
introducing the carp into the body of water.

Select embodiments of the present invention provide a device for terminating biota on a pre-specified approximate schedule, in particular fauna, and more particularly fish. An embodiment of the present invention is adapted to be incorporated into biota and comprises a container enclosing a toxin. The container may be a capsule, such as a flexible plastic capsule, incorporating at least some bioerodible material. An embodiment of the present invention comprises means proximate the payload for releasing the payload after an approximate pre-specified substantially extended time period, e.g., after one or two years releasing one or more toxins into vital areas of biota, such as blood vessels of fish.

An embodiment of the present invention also provides a method for terminating biota, in particular fauna, after a pre-established substantially extended period. One embodiment of the method of the present invention comprises emplacing a toxin-containing capsule within the fauna. The container automatically releases the toxin after a pre-established substantially extended time period when a bioerodible portion of the container substantially erodes, i.e., degrades or dissolves sufficiently to release the toxin. For example, a method of the present invention involves surgically inserting a toxin-containing capsule into a fish, such as a triploid grass carp, having pre-established a bioerodible plug in the capsule to rupture via bioerosion (i.e., biodegradation, dissolution, or both) after a pre-specified substantially extended time period. Upon opening, the capsule introduces one or more toxins into the bloodstream of the fish. In any embodiment of the present invention, the size of the capsule and its payload type and amount depend upon the application being addressed.

EXAMPLE I

Refer to FIGS. 1A and 1B showing a side view and cross-section through 1-1 of FIG. 1A, respectively, of an example empty capsule 100 that may be used in an embodiment of the present invention. The capsule 100 comprises two parts of thin material, such as plastic, the two parts joined by one part fitting into the other in an overlapping area 102 after being impressed upon a bioerodible plug 101. The sealed capsule 100 is adapted to be placed within an appropriate location in biota, e.g., the body tissue of a fish.

Refer to FIG. 3. The filled capsule 300 contains a payload 301, such as a lethal dose of a suitable toxin, and means allowing for automatically opening the capsule 300 after a pre-established duration to release the payload 301. In select embodiments of the present invention, the means for automatically opening the capsule comprise the central bioerodible plug 101. Note that the bioerodible plug 101 may not be exposed to external surfaces due to the "seal" effected by the overlapping area 102 and thus may not be dependent on an external environment to "bio-erode."

EXAMPLE II

Refer to FIGS. 2A and 2B depicting a side view and cross-section through 2-2 of FIG. 2A, respectively, of an example empty capsule 200 that may be used in an embodiment of the present invention. This capsule 200 comprises a one-piece flexible "container" that is plugged at its open end 202 by a bioerodible plug 201 that may be similar to that plug 101 used in the embodiment of FIGS. 1A and 1B.

Refer to FIG. 4. The filled capsule 400 contains a payload 301, such as a lethal dose of a suitable toxin, and means allowing for automatically opening the capsule 400 after a pre-established duration to release the payload 301. In select embodiments of the present invention, the means for automatically opening the capsule comprise the bioerodible end plug 201 inserted in the open end 402 of the capsule 400. Note that one end of the bioerodible plug 201 is exposed to the external environment in which it is placed. Thus, the time for this end plug 201 to erode may be at least partially dependent on the surrounding environment, e.g., the tissue of a fish.

EXAMPLE III

Refer to FIGS. 5A and 5B depicting a side view and cross-section through 5-5 of FIG. 5A, respectively, of an example empty capsule 500 that may be used in an embodiment of the present invention. This capsule 500 comprises a two-piece flexible "container" that is taped on its outside with bioerodible tape 501 at its center overlapping closure 102 that may bioerode in a manner similar to the bioerodible end plug 201 of FIGS. 2A and 2B. Note that the bioerodible tape 501 is exposed only to the external environment in which it is placed and not to the contents of the capsule 501. Thus, the time for this bioerodible tape 501 to erode may be wholly dependent on the surrounding environment, e.g., the tissue of a fish.

EXAMPLE IV

Refer to FIGS. 6A and 6B depicting a side view and cross-section through 6-6 of FIG. 6A, respectively, of an example empty capsule 600 that may be used in an embodiment of the present invention. This capsule 600 comprises a two-piece flexible "container" having a fitted end cap 602 that is taped on the outside of the opening end with bioerodible tape 601 that may bioerode in a manner similar to the bioerodible end plug 201 of FIGS. 2A and 2B. Note that the bioerodible tape 601 is exposed only to the external environment in which it is placed. Thus, the time for this bioerodible tape 601 to erode may be wholly dependent on the surrounding environment, e.g., the tissue of a fish.

EXAMPLE V

Refer to FIGS. 7A and 7B showing a side view and cross-section through 7-7 of FIG. 7A, respectively, of an example empty capsule 700, similar to the capsule 100 of FIGS. 1A and 1B, that may be used in an embodiment of the present invention. The capsule 700 comprises two parts of thin material, such as plastic, the two parts joined by one part fitting into the other in an overlapping area 102 after being impressed upon a central bioerodible plug 101. In select embodiments of the present invention, added to each end of the central plug 101 is a coating 701 suitable for "bioreacting" with the central plug 101, completely eroding the central plug 101 over a pre-established time period, at which time the contents of the capsule 700 are exposed by separation of the halves of the capsule 700. The sealed capsule 700 is adapted to be placed within an appropriate location in biota, e.g., the body tissue of a fish. Note that the central plug 101 and coating 701 may not be exposed to external surfaces due to the "seal" effected by the overlapping area 102 and thus may not depend on an external environment to "bio-erode." Thus, the rate at which the central plug 101 bio-erodes may be controlled to a certainty established by prior testing of the bioreactant coating 701 placed thereon.

EXAMPLE VI

Refer to FIGS. 8A and 8B showing a side view and cross-section through 8-8 of FIG. 8A, respectively, of an example empty capsule 800, similar to the capsule 200 of FIGS. 2A and 2B, that may be used in an embodiment of the present invention. The capsule 800 comprises thin material, such as plastic, the open end 802 sealed by a bioerodible end plug 201 that has a bioreactant coating 701 placed upon the end surface of the end plug 201 that is exposed to the inside of the capsule 800. The coating 701 is suitable for "bioreacting" with the end plug 201, completely eroding it over a pre-established time period, at which time the contents of the capsule 800 are exposed. The sealed capsule 800 is adapted to be placed within an appropriate location in biota, e.g., the body tissue of a fish. Note that one end of the end plug 201 and coating 701 may not be exposed to external surfaces due to the "seal" effected by the end plug 201 itself and thus may not depend fully on an external environment to "bio-erode." This is the case if the end plug 201 is constructed to be impervious to the environment in which it is placed. Thus, in select embodiments of the present invention, the rate at which the end plug 201 bioerodes may be controlled to a certainty established by prior testing of the bioreactant coating 701 placed thereon. The coating may be selected from the group consisting of: _suitable bioerodible materials such as previously mentioned candidate polymers.

By selecting an appropriate bioreactant coating 701, the pre-established time period may be varied to meet individual user requirements. The same type of selectivity may be obtained by judicious selection of the type and dimensions of bioerodible material employed to fabricate the plugs 101, 201 and the tape 501, 601.

EXAMPLE VII

Refer again to FIGS. 2A and 2B. In select embodiments of the present invention, the capsule 200 is a hollow tube constructed of inert material that is biocompatible, such as stainless steel. For use with carp, a typical configuration is 20 mm (0.8 in) in length and 3 mm (0.12 in) in diameter. The tube (capsule) 200 is filled with a toxin, such as rotenone. The end 202 of the capsule 200 is plugged with a bioerodible plug 201, preferably a polymer such as poly-1-lactide or poly(ε-caprolactone). The filled capsule 400 (FIG. 4) is injected into a region of the carp that is unlikely to reject the capsule 400 and not likely to be consumed if the carp is caught and eaten.

Appropriate locations for inserting the capsule 400, as well as suitable toxins, and lethal doses have been determined via experimentation. Studies have evaluated various locations for inserting the capsule. Considerations included a location where the device is unlikely to be consumed by humans if the fish is captured and eaten. The location with the best retention is along the longitudinal axis. Dose response relations for rotenone and grass carp of differing sizes have been developed and are applied in accordance with user's requirements.

The capsule 400 is configured to release toxin upon substantial bioerosion of the plug 201, releasing toxin, such as rotenone, into the musculature of the carp. In select embodiments of the present invention, the "release" or "dispensing" time is determined by the properties of the plug 201, the average body temperature of the carp, and the dimensions of the plug 201.

Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 CFR § 1.72(b). Any advantages and benefits described may not apply to all embodiments of the invention.

We claim:

1. A system for controlling growth of aquatic plants in a body of water, comprising:
    at least one triploid grass carp (*Ctenopharyngodon idella*); and
    means for pre-establishing the life span of said carp, comprising:
        biocompatible packaging enclosing at least one toxin; and
        bioeroding means for timing the delivery and facilitating delivery of said toxin;
    wherein said bioeroding means are incorporated entirely in said carp, and
    wherein said means for pre-establishing life span is implanted under the skin of said carp prior to introduction of said carp into said body of water.

2. The system of claim 1 in which said bioerodible means comprises at least one configuration substantially incorporating pre-specified bioerodible material.

3. The system of claim 1 in which said packaging is at least one multi-part capsule sealed prior to use, wherein said sealed capsule is suitable for retention within said carp.

4. The system of claim 1 in which said bioerodible means is selected from the group consisting of: a bioerodible plug, bioerodible tape, and combinations thereof.

5. The system of claim 4 in which said plug is cut from self-reinforced polyglycolide (SR-PGA) rods coated at least partially with material selected from the group consisting of: n-butyl-2-cyanoacrylate, Poly(dioxanone) (PDS), Poly (beta-hydroxybutyrate) (PHBA), Poly-L-lactide (PLLA), and combinations thereof.

6. The system of claim 1 in which said pre-specified bioerodible material is at least one bioerodible polymer.

7. The system of claim 6 in which said polymer is selected from the group consisting of:
    Poly(glycolide), Poly-L-actide, Poly(lactide-co-glycolide), Poly(α-caprolactone), Poly(diaxanone), Poly(glyconate), Poly(Ortho-Esters), Copolymers of glycolic, lactic, block copolymers prepared from polyethylene glycols, block copolymers prepared from Poly(Ortho-Esters), and combinations thereof.

8. A method for controlling growth of aquatic plants in a body of water, comprising:
    providing at least one triploid grass carp (*Ctenopharyngodon idella*);
    providing means for pre-establishing the approximate life span of said carp, comprising:
        biocompatible packaging enclosing at least one toxin; and
        bioeroding means for timing the delivery and facilitating delivery of said toxin;
    wherein said bioeroding means are incorporated entirely in said carp;
    implanting said means for pre-establishing lifespan into said carp; and
    introducing said carp into said body of water.

9. The method of claim 8 providing said bioerodible means as comprising at least one configuration substantially incorporating pre-specified bioerodible material.

10. The method of claim 8 providing at least part of said packaging as a multi-part capsule sealed prior to implant to be leak proof upon insertion.

11. The method of claim 8 selecting said bioerodible means from the group consisting of: a bioerodible plug, bioerodible tape, and combinations thereof.

12. The method of claim 11 in which said plug may be cut from self-reinforced polyglycolide (SR-PGA) rods coated at least partially with material selected from the group consisting of: n-butyl-2-cyanoacrylate, Poly(dioxanone) (PDS), Poly(beta-hydroxybutyrate) (PHBA), Poly-L-lactide (PLLA), and combinations thereof.

13. The method of claim 9 providing said pre-specified bioerodible material as at least one bioerodible polymer.

14. The method of claim 9 selecting said polymer from the group consisting of:
    Poly(glycolide), Poly-L-actide, Poly(lactide-co-glycolide), Poly(α-caprolactone), Poly(diaxanone), Poly(glyconate), Poly(Ortho-Esters), Copolymers of glycolic, lactic, block copolymers prepared from polyethylene glycols and certain Poly(Ortho-Esters), and combinations thereof.

* * * * *